No. 852,462. PATENTED MAY 7, 1907.
L. H. SEUBERT.
ANTIFRICTION BEARING.
APPLICATION FILED MAR. 19, 1906.
2 SHEETS—SHEET 1.
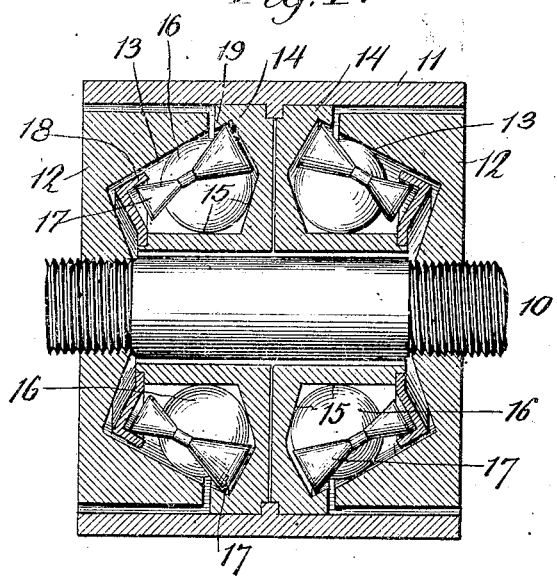
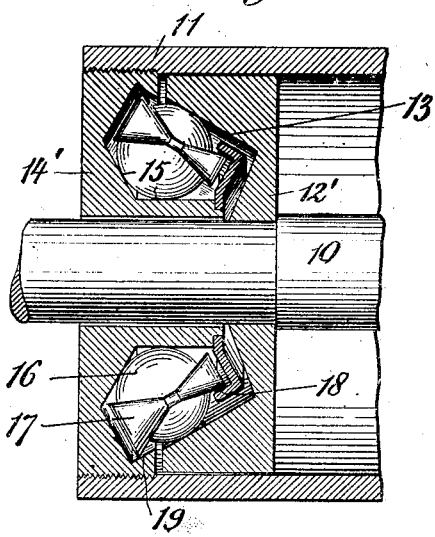
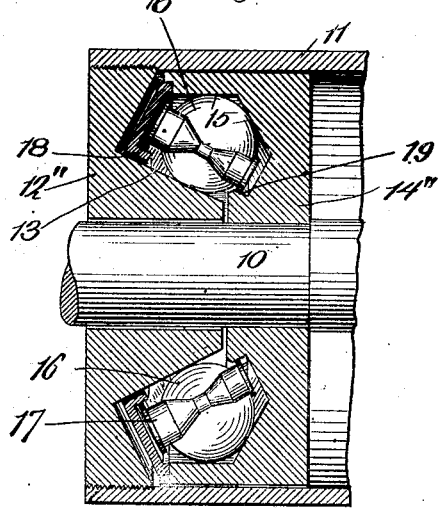
WITNESSES:
INVENTOR
Louis H. Seubert
BY
Chapin & Hayson
his ATTORNEYS No. 852,462. PATENTED MAY 7, 1907.
L. H. SEUBERT.
ANTIFRICTION BEARING.
APPLICATION FILED MAR. 19, 1906.
2 SHEETS—SHEET 2.
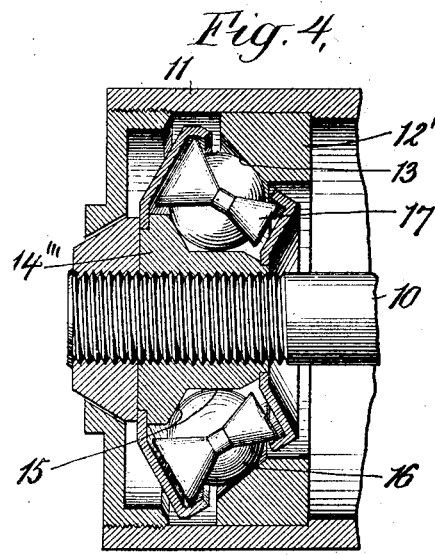
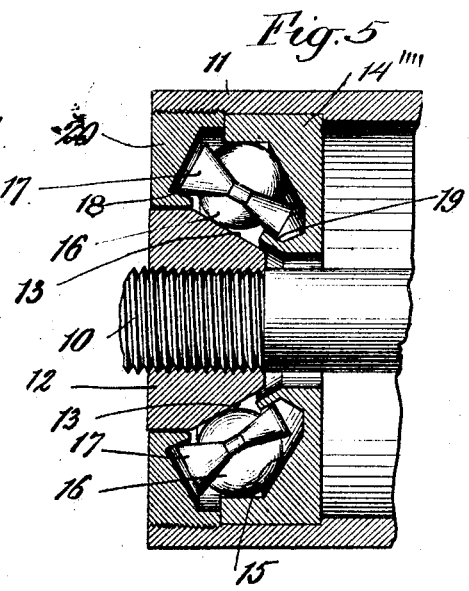
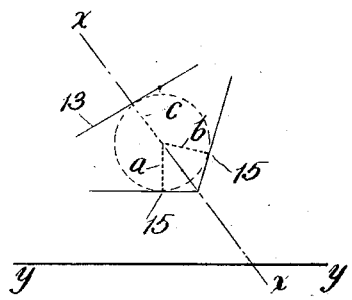
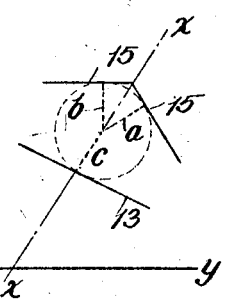
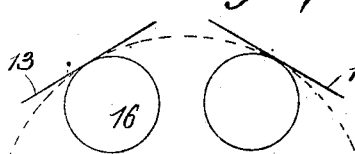
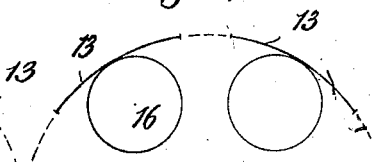
WITNESSES:
INVENTOR
Louis H. Seubert
BY
Chapin & Heymond
his ATTORNEYS

UNITED STATES PATENT OFFICE.

LOUIS H. SEUBERT, OF EAST ORANGE, NEW JERSEY.

ANTIFRICTION-BEARING.

No. 852,462.   Specification of Letters Patent.   Patented May 7, 1907.

Application filed March 19, 1906. Serial No. 306,754.

*To all whom it may concern:*

Be it known that I, LOUIS H. SEUBERT, a citizen of the United States of America, and a resident of East Orange, county of Essex, State of New Jersey, have invented certain new and useful Improvements in Antifriction-Bearings, of which the following is a specification, reference being had to the accompanying drawings forming a part thereof.

My invention relates to anti-friction bearings, and particularly to that class of anti-friction bearings known as roller or ball bearings.

In the ordinary form of roller or ball bearings concentric bearing members are provided with rollers or balls between them, upon which the said members roll in their relative rotation. Because all the rollers revolve in the same direction it follows that the adjacent surfaces of contiguous rollers move in opposite directions, and hence that there is a rubbing contact resulting in more or less friction between the bearing rollers themselves.

It is the object of the present invention to provide an improved form, construction and arrangement of bearing, in which separating rollers are employed between the bearing rollers to space the same, supplementary tracks being provided upon which these separating rollers may travel.

The best form of roller bearing for most purposes is one in which the resultant lines of force which pass through the bearings are oblique to the axis of rotation of the bearing, and it is to this specific class of bearing that my present invention particularly relates.

My invention also consists in an arrangement and construction of bearing in which provision is made whereby one bearing member may tip or cant with respect to the other, so that the two members may be thrown out of alinement to a certain extent without thereby cramping the parts or seriously affecting the efficient running qualities thereof.

In order that my invention may be fully understood, I will now describe certain embodiments thereof illustrated in the accompanying drawings, and will then point out the novel features in claims.

In the drawings: Figure 1 is a view in central vertical longitudinal section through an anti-friction bearing embodying my invention. Figs. 2, 3, 4 and 5 are similar views through one set of the said bearings, the relationship and construction of parts being slightly modified. Figs. 6 and 7 are diagrammatic views illustrating the direction of the resultant lines of force of the bearing tracks with relation to the axis of the bearing. Figs. 8 and 9 are diagrammatic views showing the tangential and concentric relationship of the bearing members with respect to a common axis about which one portion of the bearing may tip or cant with respect to the other.

Referring first to Fig. 1, reference character 10 designates a central shaft, which may conveniently be a stationary axle, and 11 a hub, which may be considered as the rotative element. Secured fast to the axle 10 are bearing members 12 having inwardly facing outer tracks or runways 13. Said inwardly facing outer tracks 13 are obliquely arranged with respect to the axis of rotation of the bearing, as will be seen. The hub 11 is provided with complementary bearing members 14 with outwardly facing inner tracks or runways 15. The resultant of two lines perpendicular to the tracks 15 of any one member 14 (on a sectional plane passing through the axis of the bearing) is a line substantially perpendicular to the track 13 of the complementary member 12. This will be seen by reference to Fig. 6, in which *a b* are lines perpendicular to the tracks or runways 15, the resultant *c* of which is a line substantially perpendicular to the track or runway 13. This means that the lines of force *x x* are oblique to the axis *y y* of the bearing.

Bearing rollers 16 (here shown in the form of spheres) are disposed between the tracks 13 and 15, one set of balls for each pair of members 12, 14. These spheres contact theoretically at three points, the said bearings having a planetary movement about the surface of a theoretical cone.

A set of separating rollers 17 (here shown as substantially spool-shaped) are provided for each set of bearing rollers, said separating rollers being disposed one each between adjacent rollers of each set. These separating rollers may conveniently contact with, and act to separate, the said bearing rollers, and, in their rotation, will form only rolling contact with the bearing rollers, all rubbing contact between them being entirely eliminated. Opposite sides of any one separating roller turning, of course, in opposite directions, such directions will have the proper relation to the movement of rotation of adjacent sides of contiguous bearing rollers, as will be well understood, and the effect of such a construction and combination will be to theoretically eliminate all friction. Supplementary tracks 18 and 19 are provided against which the edges of the separating rollers 17 will travel, the said tracks forming bearing runways opposing the bearing relation between the supplementary rollers and the bearing rollers.

In Fig. 2 a similar form of bearing is illustrated, except that the relative position of the members 12 and 14 is reversed, the member 14 being placed at the end of the bearing as a whole, the member 12 being upon the opposite side thereof to which it is shown in Fig. 1. In this figure the corresponding elements 12 and 14 are designated in the drawings as 12' and 14'.

In Fig. 3 the arrangement of parts is an inversion of the arrangement of parts shown in Fig. 1, the member 14'' corresponding to the member 14 of Fig. 1 being secured to the shaft or axle 10, and having its tracks 15 arranged as the outer tracks and facing inwardly, while the member 12'' corresponding to the member 12 of Fig. 1 is secured to the hub 11 and has its track 13 arranged as the inner track, facing outwardly. The supplementary tracks 18 in this example face outwardly instead of inwardly, as they do in Fig. 1.

Fig. 4 shows practically an inversion of the arrangement of parts shown in Fig. 3, the members therein designated 12''' and 14''' corresponding to the members 12'' and 14'' of Fig. 3, while in Fig. 5 one of the supplementary tracks 18' is arranged in a part 20 separately secured to the hub, i. e. a part secured to the hub independently of the member 14'''', and which corresponds to the members 14, 14', 14'', 14''' of the other figures. The shapes and forms of the parts are varied throughout, it being well understood that my invention is in no way limited to the precise form and construction of the parts, and it will be also understood that the shaft or axle 10 may be a stationary or rotative member, as also may be the hub 11. In other words the hub may rotate and the shaft be stationary, the shaft may rotate and the hub be stationary, or both parts may rotate but at different speeds or in different directions.

In Fig. 8 I have shown diagrammatically the preferred relationship of angle of the tracks (either inner or outer), the same being substantially tangent to a circle struck from the center of the bearing as a whole. The result of such an arrangement is that the relative stationary and rotative bearing members may be quite a little out of line without the parts becoming cramped, or the efficiency of the anti-friction qualities of the bearing being seriously affected.

It will be readily understood by reference to the diagram of Fig. 8 that the rollers 16 may move along the faces of the tracks 13 for quite a little distance in either direction without any serious dis-arrangement of parts. The diagram Fig. 8 may be directly applied to the form of bearing shown in Fig. 1, the angle of the tracks 13 and their relationship to each other being precisely in Fig. 8 the same as they are in Fig. 1.

Instead of the tracks 13 being straight, they may be curved, as will be well understood, and if the curves thereof are concentric with the center of the bearing as a whole, as shown in the diagram Fig. 9, the bearing members may be tilted with respect to each other to any degree permitted by the parts without thereby affecting the running qualities thereof.

What I claim is:

1. In an anti-friction bearing, the combination with concentric relative stationary and rotative elements each provided with tracks or runways, said tracks or runways comprising two sets the resultant lines of force through each of which are oblique, of bearing rollers for each set of tracks, separating rollers between the bearing rollers, and supplementary tracks for the separating rollers.

2. In an anti-friction bearing, the combination with concentric relative stationary and rotative elements, each provided with bearing runways, the bearing runways of one element being nearer together than the bearing runways of the other element, of bearing rollers for each set of bearing runways, separating rollers between the bearing rollers, engaging same, and supplementary tracks for the separating rollers.

3. In an anti-friction bearing, the combination with concentric relative stationary and rotative elements each provided with tracks or runways, said tracks or runways comprising two sets the resultant lines of force through each of which are oblique, of bearing rollers for each set of tracks, spool-shaped separating rollers between the bearing rollers, and supplementary tracks for the separating rollers.

4. In an anti-friction bearing, the combination with concentric relative stationary and rotative elements, each provided with tracks or runways, of bearing rollers for each set of tracks, an obliquely arranged series of intermediate separating rollers between the bearing rollers, and supplementary tracks for the separating rollers, substantially as described.

5. An anti-friction bearing comprising a bearing member having tracks, series of main rollers, obliquely arranged series of intermediate spool-shaped separating rollers confined within said tracks, and an opposing bearing member against which said main rollers are arranged to travel, substantially as set forth.

6. An anti-friction bearing comprising a bearing member having tracks, series of main rollers, obliquely arranged series of separating rollers confined by said tracks, and an opposing bearing member arranged with its bearing surface contacting with said main rollers at points farthest removed from the center of rotation, substantially as described.

7. In an anti-friction bearing, the combination with two bearing members, each provided with tracks or runways, and bearing rollers mounted between the said tracks, the tracks of one of said members being substantially coincident with a circle concentric with the center of the bearing, of separating rollers for the bearing rollers, and supplementary tracks for the separating rollers.

8. In an anti-friction bearing, the combination with two bearing members, each provided with tracks or runways, and bearing rollers mounted between the said tracks, the tracks of one of said members being substantially tangent to a circle concentric with the center of the bearing, of separating rollers for the bearing rollers, and supplementary tracks for the separating rollers.

LOUIS H. SEUBERT.

Witnesses:
D. HOWARD HAYWOOD,
LYMAN S. ANDREWS, Jr.